United States Patent [19]

Hornak

[11] Patent Number: 4,704,246
[45] Date of Patent: Nov. 3, 1987

[54] CRIMPING

[75] Inventor: Leonard P. Hornak, N. Huntingdon Twp., Westmoreland County, Pa.

[73] Assignee: Westinghouse Electric Corp., Pittsburgh, Pa.

[21] Appl. No.: 813,309

[22] Filed: Dec. 24, 1985

Related U.S. Application Data

[62] Division of Ser. No. 617,855, Jun. 6, 1984, Pat. No. 4,627,142.

[51] Int. Cl.$^4$ .............................................. G21C 19/00
[52] U.S. Cl. .................................. 376/260; 29/400 N; 29/402.01; 29/517; 414/146; 414/728
[58] Field of Search ............... 376/260, 463, 446, 353; 29/723, 400 N, 402.01, 426.1, 517, 283.5; 414/146, 728

[56] References Cited

U.S. PATENT DOCUMENTS

| 4,036,692 | 7/1977 | Walton | 376/446 |
|---|---|---|---|
| 4,069,575 | 1/1978 | Sigmund | 29/517 |
| 4,139,315 | 2/1979 | Levy et al. | 376/463 |
| 4,192,171 | 3/1980 | Hamilton | 29/517 |
| 4,250,733 | 2/1981 | Ruhl et al. | 29/517 |
| 4,292,130 | 9/1981 | Viaud et al. | 376/446 |
| 4,585,613 | 4/1986 | Styskal et al. | 376/260 |
| 4,590,671 | 5/1986 | Havoic-Conroy | 29/400 N |
| 4,627,142 | 12/1986 | Hornak | 414/728 |

FOREIGN PATENT DOCUMENTS 0048343  3/1982  European Pat. Off. ............ 376/446

OTHER PUBLICATIONS

"Artificial Intelligence: The Future In Nuclear Plant Maintenance," Norgate, Nuclear News, pp. 57–61, 12/84.

Primary Examiner—Deborah L. Kyle
Assistant Examiner—Daniel Wasil
Attorney, Agent, or Firm—H. Diamond

[57] ABSTRACT

A method of crimping a locking cap secured to the nut of a new split-pin assembly to the new split-pin to preclude turning of the nut and pin relative to each other. The method is practiced with apparatus including a crimping mechanism including crimping jaws having crimping pins face-to-face near one end. The jaws have external cam surfaces. The crimping pins are retracted and brought into crimping engagement with the cap to be crimped by cam followers which traverse the cam surfaces when actuated hydraulically through a C-frame connected to the cam followers. The crimping mechanism is mounted on a support which is moveable by a hydraulic cylinder between a retracted setting, where it is latched generally vertically, and an operating setting where it is positioned generally horizontally. The support is pivoted vertically from the retracted position to an intermediate horizontal position during a first part of the stroke of the piston rod of the cylinder and is pivoted horizontally in position to perform a crimping operation during the last part of the stroke of the piston rod.

7 Claims, 19 Drawing Figures

CRIMPING

REFERENCE TO RELATED APPLICATION

This application is a division of application Ser. No. 617,855 filed June 6, 1984 for CRIMPING (herein parent application) and assigned to Westinghouse Electric Corporation, now U.S. Pat. No. 4,627,142.

Application Ser. No. 576,645 filed Feb. 3, 1984 to John L. Land, Ronald J. Hopkins, and Jose M. Martinez for *Replacement Support Pin for Guide Tubes for Operating Plant* and assigned to Westinghouse Electric Corporation, is incorporated herein by reference.

Application Ser. No. 617,857 filed concurrently herewith to Raymond M. Calfo, George F. Dailey, and Raymond P. Castner for *Replacement of Split Pins in Guide Tubes* (herein Calfo), assigned to Westinghouse Electric Corporation, is incorporated herein by reference.

BACKGROUND OF THE INVENTION

This invention relates to nuclear reactors and it has particular relationship to the replacement of the old split-pin assemblies of a guide tube of a nuclear reactor by new split-pin assemblies. The reasons for the replacement and the practice of replacing the old split-pin assemblies are described in detail in Calfo. There are usually about 61 guide tubes in a nuclear reactor and all old split-pin assemblies, two in each guide tube, must be replaced. The guide tubes and the old nut and old split pin of the old split-pin assemblies are highly radioactive. To avoid the hazards of radioactivity the replacement is carried out at a substantial depth under borated water by robotic tools controlled from a robotic command center on a deck above the pool. The command center includes a programmable computer. The guide tube includes an upper section and a lower section, the latter being herein referred to as the lower guide tube or LGT. The split-pin assembly is secured in counterbores of the lower flange of the LGT. The assembly includes an old split pin and an old nut. The nut is threaded onto the split pin and seated on the base of the upper counterbore; the pin has a flange which extends into the lower counterbore.

In processing a guide tube for replacement, the LGT is separated from the upper section and transferred to the robotic work station where it is precisely positioned for processing. Next the old split-pin assembly is severed into fragments by metal disintegration machining, the fragments are removed from the upper and lower counterbores, the counterbores are cleaned, a new nut is placed in the upper counterbore, a new split pin is inserted through the lower counterbore and the new nut is torqued onto the new pin and seated on the base of the upper counterbore. At this point it is necessary to secure the new nut and new split pin together so that they do not rotate with reference to each other. In the old split-pin assembly, this object is accomplished by a dowel pin which traverses the nut and pin near their upper ends and is welded to the old nut. The old nut as well as the new nut is composed of AISI type 304 stainless steel or like alloy. This alloy cannot readily be welded under water. During the replacement the welded dowel-pin joint of the old split-pin assembly is replaced by crimped joint in the new split-pin assembly. For this purpose the nut is fabricated with a locking cap secured near its upper end and the new split pin is fabricated with an upper stem having grooves, specifically flutes. After the new nut is torqued onto the new split pin and secured in the upper counterbore, the locking cap extends above the new nut opposite to the flutes in the new split pin. It is necessary to crimp the locking cap securely into the flutes so as to preclude rotation of the new nut and pin relative to each other.

The parent application is directed to a crimping tool including a crimping mechanism. It is an object of this invention to provide a method of crimping by means of this crimping mechanism to accomplish the above-stated purpose.

In meeting this object one is confronted by a number of serious problems. The robotic work station includes six tools in addition to the crimping tool. It is necessary that in the practice of the method, the crimping be carried out in cooperation with, and within the limited space confines, afforded by the other tools. It is also necessary that the crimping be capable of remote control from the robotic control center, either step-by-step manually or automatically under the commands of a programmable computer.

The new split-pin assembly, as mounted in the lower flange of the LGT, is accessible only over a cylindrical solid angle of about 180° and is not accessible from the top. As mounted in the lower flange of the LGT, the split-pin assembly, old and new, extends into the "mouse hole" of the LGT and is spanned above by the wall of the LGT whose edge bounds the "mouse hole". There is no access for engagement with the locking cap from the top in carrying out a crimping operation.

It is an object of this invention to overcome the above drawbacks and disadvantages and to provide a method uniquely suitable for effectively crimping a locking cap to a new split pin in the limited space available in the robotic work station and notwithstanding the unavailability of access to the locking cap from the top.

SUMMARY OF THE INVENTION

The method of crimping in accordance with this invention is carried out with a crimping mechanism which is mounted on a support. The support is in the standby state of the mechanism latched in a retracted setting and when unlatched is displaceable to an operating setting in which the crimping mechanism is positioned to carry out a crimping operation on a new split-pin assembly.

The crimping mechanism is an "ice tong" shaped structure having jaws pivotal on a pivot pin. Near one end each jaw is provided internally with a tapered crimping pin. The jaws are mounted on the pivot pin with their crimping pins face-to-face and are moveable between a setting in which the crimping pins are retracted and a setting in which the crimping pins are in crimping position. Externally each jaw has a cam surface. The jaws are mounted on the pivot pin near one end of the support. Inwardly of the jaw. The crimping mechanism includes a "C"-shaped which straddles the support and is connected to a fluid cylinder which is capable of moving the C-frame forwardly and backwardly along the support. The frame carries cam-follower rollers which engage the cam surfaces on the jaws and, when the "C"-frame is moved by the cylinder, displace the jaws between the retracted setting and the crimping setting.

Typically the support is a cantilever which is latched in vertical position and is mounted pivotal, by a fluid cylinder, both about a horizontal axis and about a vertical axis. When the support is unlatched, it is pivoted vertically about the horizontal axis to a stop, at an intermediate position during a part of the stroke of the piston of the cylinder. Then, during a continuation of the stroke of the piston, the support is pivoted horizontally about the vertical axis, setting the crimping mechanism in its crimping setting. Then the "C"-frame is actuated by its cylinder to crimp the locking cap to the new split-pin.

A crimping operation is performed by carrying out the following successive steps:

1. The support for the crimping mechanism is unlatched.
2. The support is swung from its retracted position to its intermediate position in a direction generally defined by a first plane which is typically a vertical plane.
3. The support is then advanced from the intermediate position in a second direction defined by a plane generally transverse to the first plane, which is typically a horizontal plane, setting the crimping mechanism laterally of the new split-pin assembly in crimping position with the jaws of the crimping mechanism encompassing the locking cap.
4. The "C"-frame is actuated to travel forward closing the jaws of the crimping mechanism on the locking cap and crimping the cap into the flutes of the split pin.
5. The "C"-frame is actuated to travel backward i.e., is retracted, opening the jaws.
6. The crimper mechanism support is returned to its retracted position, i.e., typically the vertical position.
7. The support is latched in the retracted position.

BRIEF DESCRIPTION OF THE DRAWINGS

For a better understanding of this invention, both as to its organization and as to its method of opertion, together with additional objects and advantages thereof, reference is made to the following description, taken in connection with the accompanying drawings, in which.

DETAILED DESCRIPTION OF THE PREFERRED EMBODIMENT

Figures 1, 2, 16, 17:
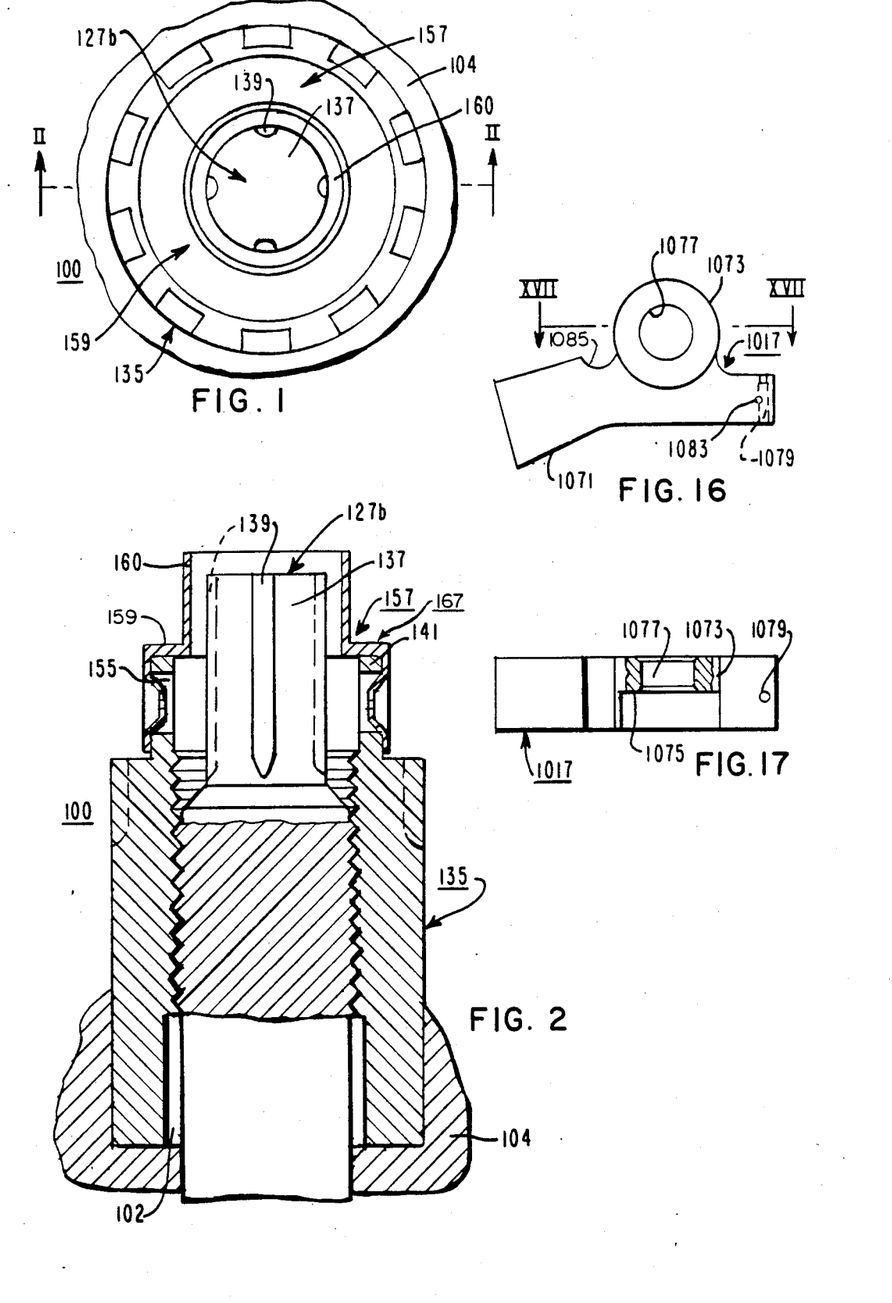
FIG. 1 is a plan view enlarged of a new split-pin assembly which is subjected to a crimping operation in the practice of this invention.
FIG. 2 is a view in section taken along line II—II of FIG. 1.
FIG. 16 is a plan view of a crimping jaw used in the crimper tool.
FIG. 17 is a view in section, taken along line XVII—XVII of FIG. 16 showing a fragment of the crimper tool housing.
Figure 7:
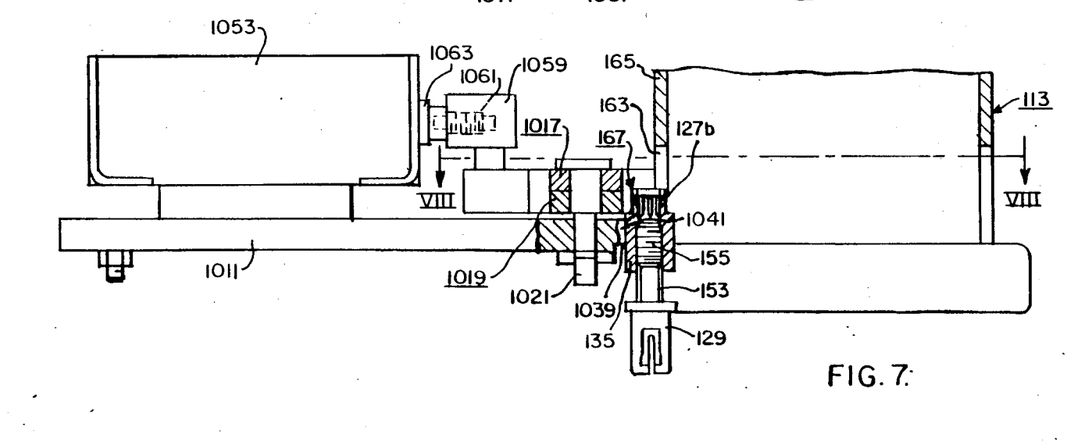
FIG. 7 is a fragmental view in side elevation, and partly in section, of the part of the crimper which performs the crimper operation.
Figure 8:
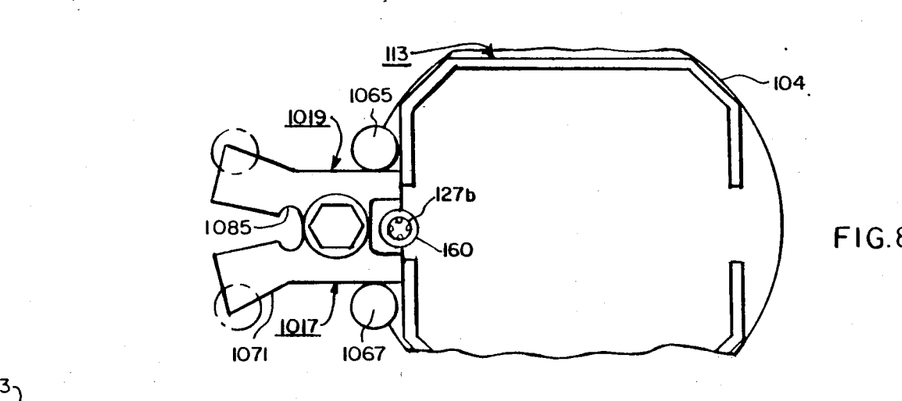
FIG. 8 is a fragmental view in transverse section taken along line VIII—VIII of FIG. 7.

FIGS. 1 and 2 show a new split-pin assembly 100 mounted on the upper counterbore 102 of the flange 104 of an LGT 113 (FIGS. 7, 8). The split pin assembly 100 includes a new split pin 127b and a new nut 135. The new split-pin 127b has an upper stem 137 in which two pair of oppositely disposed flutes 139 are provided. A collar 141 extends from a shoulder at the top of the nut 135. The collar 141 has diametrically disposed circular holes 155. The nut 135 is fabricated with a locking cap 157 securely crimped into the holes 155. The locking cap 157 has a pedestal 159 from which a cylindrical shell 160 extends. The shell 160 is coaxial with, and encircles, the stem 137 having the flutes 139. As mounted on the flange 104, the new split-pin assembly 100 extends into the "mouse hole" 163 (FIG. 7) and is straddled by the edge of the wall 165 of the guide tube 113. In accordance with the invention a method of crimping the shell 160 of the locking cap 157 to the stem 137 is provided. The crimping must be such that the locking cap 157 joins the nut 135 and the split pin 127b so securely that rotation of one relative to the other under the forces exerted by the coolant of the reactor is precluded.

The method according to this invention is practiced with the crimper tool 221 (FIGS. 3-17) which includes the crimper mechanism and its support and the means for actuating the crimper mechanism in the practice of this invention.

Figure 3:
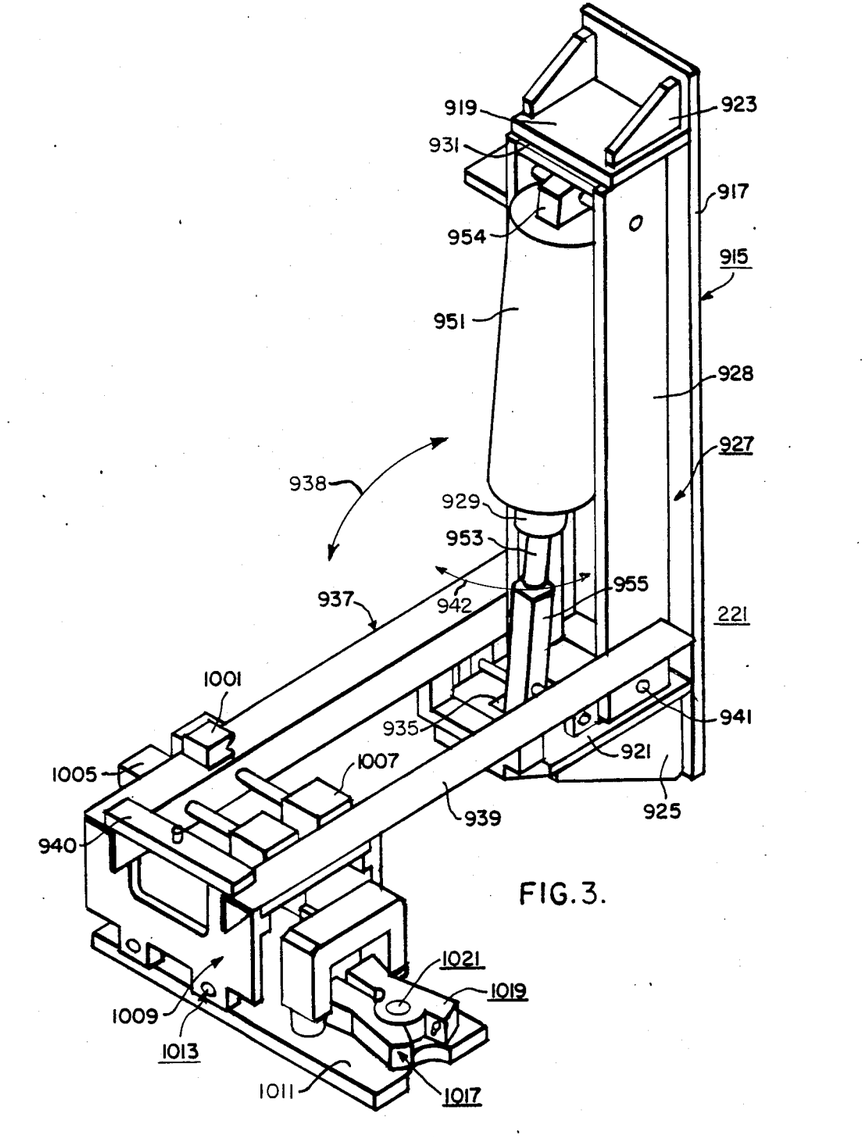
FIG. 3 is a simplified view in isometric showing generally the apparatus for practicing this invention including the crimping mechanism and its support with this mechanism in crimping position with parts omitted for clarity.
Figures 9, 10, 11, 12:
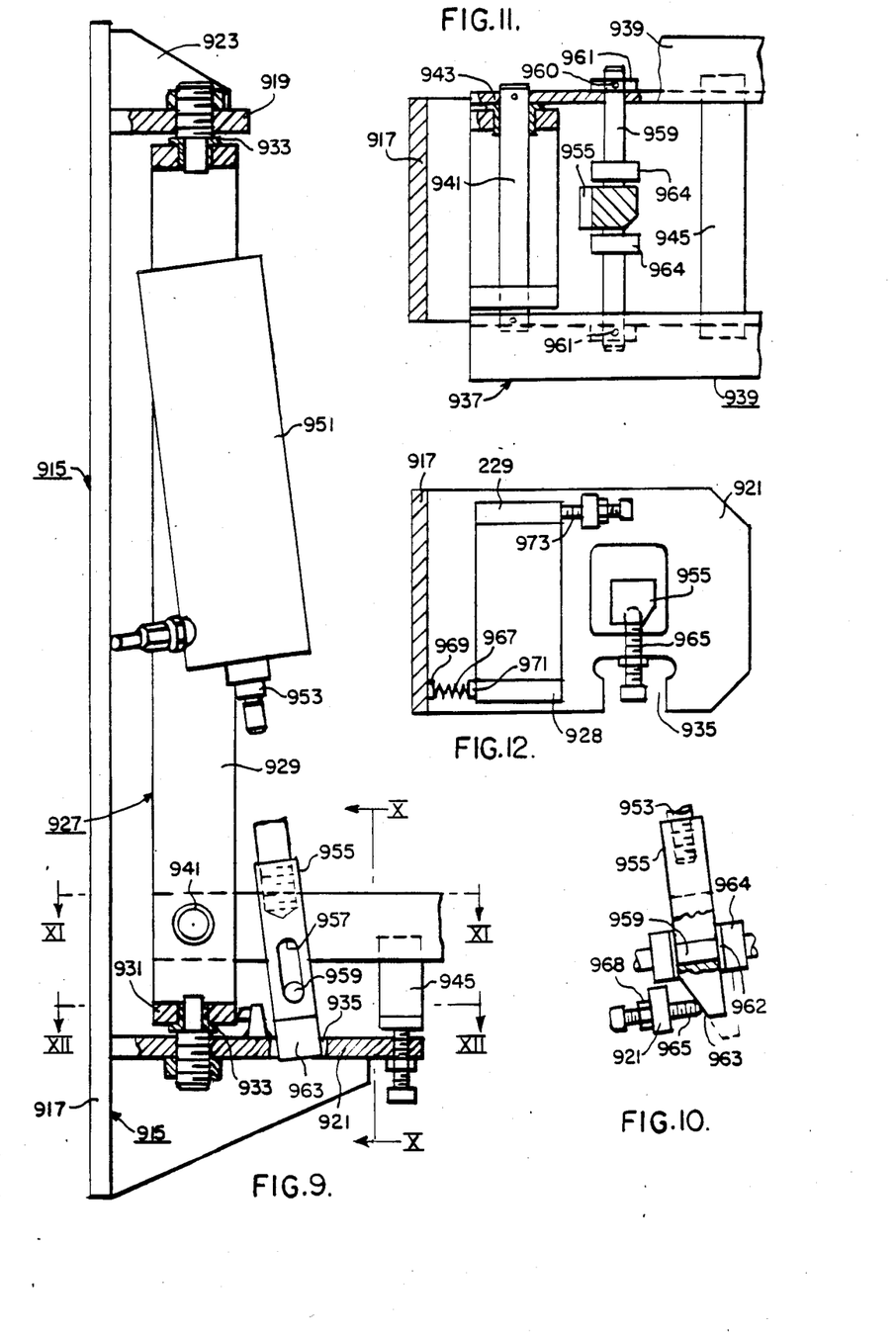
FIG. 9 is a view in front elevation, and partly in section, showing particularly the lower portion of the support for the apparatus for practicing this invention with the support in the retracted position.
FIG. 10 is a fragmental view in side elevation; and partly in section, taken in the direction X—X of FIG. 9 showing the camming action which advances the crimping head of the crimper horizontally.
FIG. 11 is a fragmental view in transverse section taken along line XI—XI of FIG. 9.
FIG. 12 is a fragmental view in transverse section taken along line XII—XII of FIG. 9.
Figure 13:
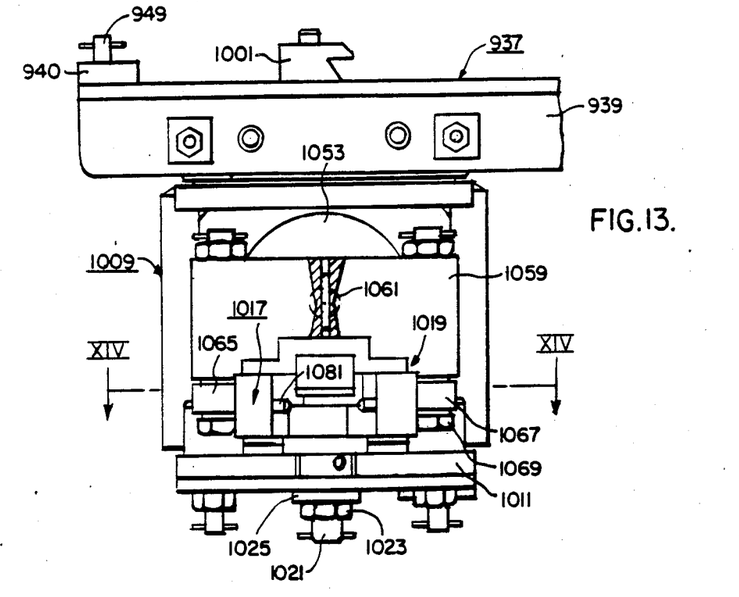
FIG. 13 is a fragmental view in end elevation, taken in the direction XIII of FIG. 5, showing the mechanism which produces the crimping.

The crimper tool 221 includes a support 915 formed of a vertical plate 917 having welded near its top and bottom horizontal plates 919 and 921 braced by trapezoidal plates 923 and 925. The vertical plate 917 is mounted on a cluster plate (not shown) which is in turn suspended from a strong-back (not shown) supporting the robotic tools, in the work station, which carry out the replacement of the old split-pin assemblies by the new split-pin assemblies (see Calfo). The plate 921 has a slot 935 (FIGS. 3, 9). A frame 927 having vertical sides 928 and 929 and horizontal sides 931 is mounted pivotal about a vertical axis on flanged bushings 933 (FIG. 9) secured to the top and bottom support plates 919 and 921 and engaging the horizontal sides 931 so that their centers define the pivot axis.

Figures 4, 4A:
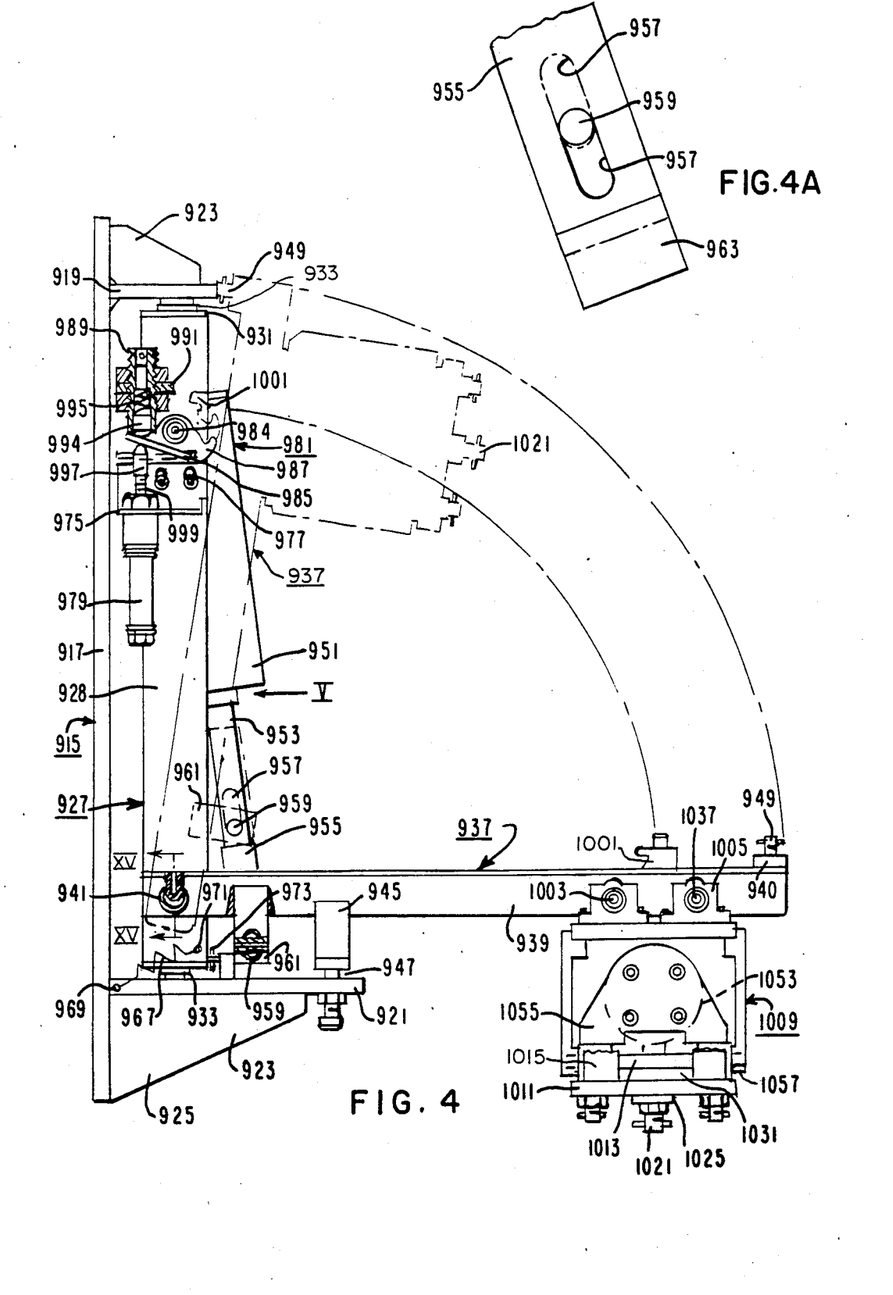
FIG. 4 is a view in front elevation of the apparatus showing the crimper in full lines in the operating position and in broken lines in the retracted position.
FIG. 4A is a fragmental plan view of the extension of the piston rod which positions the crimping mechanism showing the manner in which it operates.

An angle support 937 (FIGS. 3, 4, 5) formed of angles 939 braced by a cross plate 940 is mounted pivotally at one end on the frame 927 on a pin 941 (FIG. 15) extending between the vertical sides 928 and 929. The pin rides in bushings 943 (FIG. 11) in the sides 928 and 929. The angle support 937 is pivotal on the pin 941 between the operating position shown in full lines in FIG. 4 and the retracted or storage position shown in broken lines. The angle support 937 carries a stop bracket 945 which engages adjustable stop bolts 947 (FIG. 4) extending upwardly near the ends transversely of the bottom plate 921 of the fixed support 915. Being suspended from the frame 927, the support 937 is also pivotal about the vertical axis about which the frame is pivotal. Arrow 938 (FIG. 3) shows the direction of the vertical pivoting movement of support 937 about pin 941 and arrow 942 shows the direction of the horizontal pivoting movement about the axis of the flanged bushings 933. The bracket 945 and the stops 947 prevent the angle support 937 from dropping below the plate 921. The angle support 937 also has an adjustable stop 949 (FIG. 4) which abuts the end of the top plate 919 when the angle support is in the retracted position. With reference to FIG. 4, the angle support 937 is pivoted vertically in the plane of the drawing and horizontally into and out of the drawing. It is to be realized that under certain circumstances the crimper tool 221 and the split-pin assembly may be oriented so that the frame is supported in another position than vertically and may be pivoted first directly out of this position and then in a direction transversely or laterally to the first direction.

The angle support 937 is pivotal between the operating and the retracted positions by a cylinder 951. The cylinder 951 is pivotally suspended on a pin 952 (FIG. 5) passing through a clevis 954 which is bolted to the upper side 931 of the frame 927. The piston rod 953 of the cylinder 951 has an extension 955 which carries a slot 957 (FIGS. 4, 9). The slot is engaged by a pin 959 carried by plates or tabs 961 (FIGS. 4, 11) welded to the angles 939. The pin 959 is secured in tabs 961 by cross pins 960. The pin 959 is positioned in the slot 957 between bronze bushings 962 in collars 964 (FIG. 10). Below the slot 957 and pin 959, the piston-rod extension 955 has a cam surface 963 (FIG. 10) which extends into slot 935 in bottom plate 921. The cam surface 963 (FIG. 10) is engaged by the tip of a bolt 965, which serves as cam follower, and which extends into the slot 935 of lower plate 921. The position of bolt 965 is adjustable. In any position, the bolt 965 is locked by nut 968 against plate 921.

With the angle support 937 in retracted position, the tabs 961 are in the position shown in broken lines in FIG. 4 with the sides (as distinct from the ends) of slot 957 in engagement with pin 959 so that the upper side of the slot can exert a downward force on the pin. Only tab 961 is shown in broken lines, (pin and slot not shown). When the piston rod extension 955 is moved downwardly by actuation of cylinder 951, the tabs 961 are moved downwardly with the upper side of slot 957 and turned. The angle frame 937 is pivoted to the operating, generally horizontal, position and the tabs 961 are in the full line position shown in FIG. 4 (bottom). The movement of the angle frame 937 is stopped by engagement of bracket 945 with stop 947. With the angle frame in this position the pin 959 is engaged with the lower end of slot 957 as shown in FIG. 4 where the slot 957 is shown in broken lines. As the piston rod extension 955 now continues to be moved downwardly by cylinder 951, the slot 957 moves to the full-line position shown in FIG. 4A. Pin 959 remains fixed and angle support 937 remains horizontal. But during the movement of the slot to the full-line position shown in FIG. 4A, the angle support 937 is pivoted generally horizontally about the axis of bearings 933 by the coaction of pin 965 and cam surface 963 (FIG. 10). This motion is produced by the action of pin 959 against a side of slot 957.

A tension spring 967 (FIGS. 4, 12) connected between an anchor 969 at the inner end of plate 921 and an anchor 971 on the vertical side 928 of the frame 927 exerts a force pulling the frame 927 and the parts connected to it inwardly. Excessive displacement of the frame is prevented by a stop 973 (FIG. 12) engaging the other side 929 of the angle frame.

An angle bracket 975 (FIGS. 4, 5) is bolted to side 928 of the frame 927. The bolts securing the bracket 975 to side 928 pass through slots 977 so that the height of the bracket 975 is adjustable. A cylinder 979 is suspended from the horizontal member of the bracket 975. A latch 981 is pivotally suspended from the side 928 on a plurality of washers 983 (FIG. 5) and a bolt 984. The latch 981 has a flat tail-plate 985 which extends inwardly and a hook 987 which extends outwardly. Above the tail plate 985 a sleeve housing 989 is threaded into a horizontal plate 991 suspended from side 928. The position of the housing 989 is adjustable along plate 991 and the housing may be locked in any position by nuts 993. The lower part of the housing 989 is widened providing a shoulder between the upper and lower parts. A spring pin 994 having a tapered tip extends through the housing 989. The pin 994 has a shoulder from which a stem extends into the restricted portion of the housing. A compression spring 995 acts between the shoulder in the housing 989 and the shoulder on the pin, resiliently urging the pin downwardly into engagement with the upper surface of tail-plate 985 and pivoting the latch 981 counter-clockwise (as viewed in FIG. 4) on the pivot 984. The force of the spring is counteracted by the cylinder 979. This cylinder has an extension 997 on its piston rod 999 which engages the lower surface of tail-plate 985 and pivots the latch 981 clock-wise. The angle support 937 carries a strike or hook 1001. When the angle support is retracted, the piston rod 999 of cylinder 979 is retracted so that the latch 981 is swung to its most counter-clockwise position engaging hook 1001 securing the angle support 937 and the components which it carries in the retracted position. When the angle support is to be set in the operating position, the piston rod 999 is extended rotating the latch 979 clockwise and disengaging hook 1001.

Figures 5, 6:
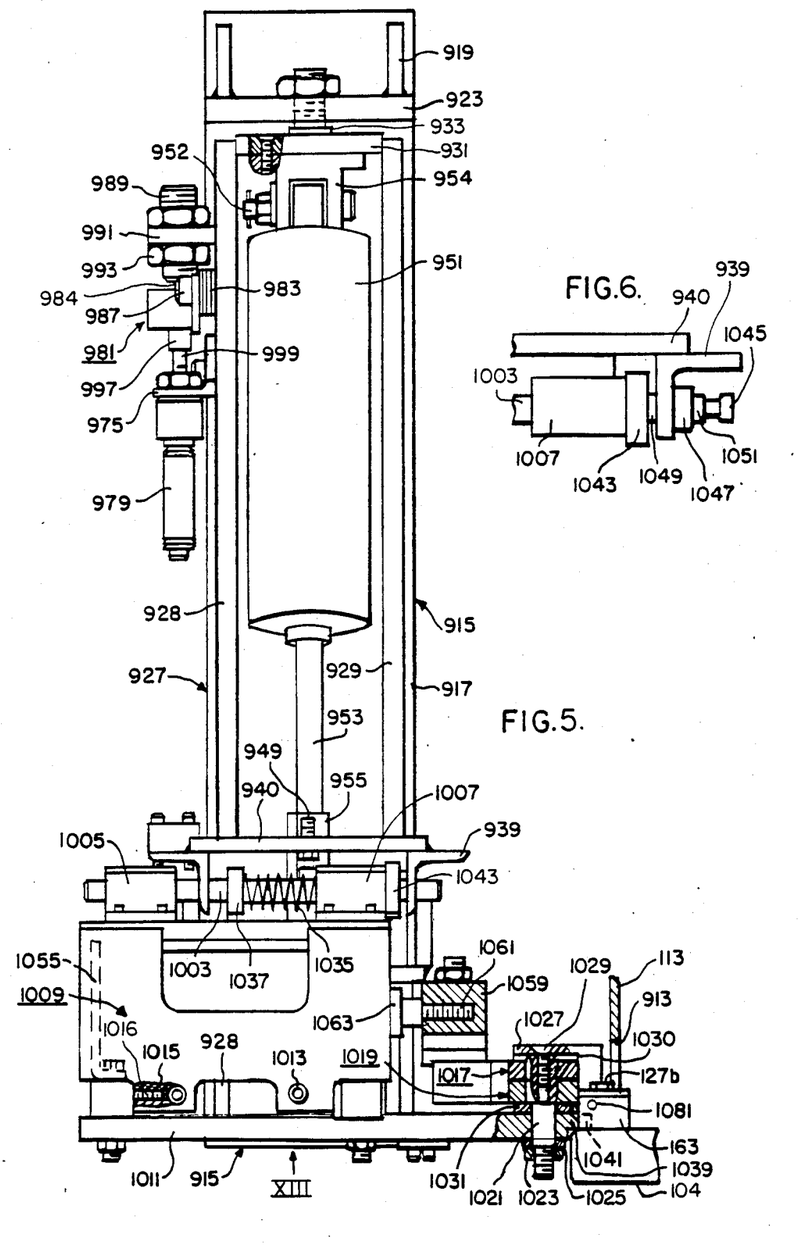
FIG. 5 is a view in side elevation, partly in section of the apparatus in operating position taken in the direction V of FIG. 4.
FIG. 6 is a fragmental plan view showing an adjusting structure for the crimping mechanism.

Near the end remote from the support, guide rails 1003 are secured to the vertical members of the angles 939 (FIGS. 4, 5) as seen in solid lines in FIG. 4. Two sets of pillow blocks 1005 and 1007 are slideable along the guide rails. The pillow blocks 1005 and 1007 support a carriage or housing 1009. The carriage 1009 supports a base plate 1011 on rods 1013 (FIGS. 4, 5). The rods 1013 penetrate through blocks 1015 welded to the base plate 1011 (FIG. 4). The base plate and the parts connected to it may be moved along the rods 1013 relative to carriage 1009 so that its position in the direction perpendicular to the axes of the rails 1003 (along the plane of FIG. 4 parallel to beams 939) may be set. The base plate 1011, once set, is secured in the set position by set screws 1016 (FIG. 5). Crimping jaws 1017 and 1019 are mounted pivotally on a pin 1021 is secured near the outer end of the base plate. The pin 1021 is secured by a locking nut 1023 which is threaded onto the lower end of the pin 1021 and engages a washer 1025 between the nut and the plate 1011 (FIGS. 4, 5). At the top the pin 1021 is secured to an angle block 1027 by a cap screw 1029. A washer 1030 is interposed between the block 1027 and the pivoting bearings of the jaws but engages a shoulder on pin 1021 clearing the bearings. Another washer 1031 is interposed between the base plate 1011 and the pivoting bearings of the jaws and a shoulder on pin 1021.

Each guide rail 1003 carries a compression spring 1035 (FIG. 5). Each spring engages pillow block 1007 at one end and is engaged by a member 1037 clamped to the guide rail at the opposite end. The springs 1035 resiliently urge the pillow blocks 1007 and the parts connected to them including the base plate 1011 outwardly; i.e. away from plate 928; to the right as seen in FIG. 5. At its outer end, the base plate 1011 has a downwardly facing shoulder 1039 (FIG. 7). Above this shoulder the base plate terminates in a cylindrical surface 1041 (FIGS. 5 and 7) which has the same curvature as the nut 135 of the new split-pin assembly 127b. The relative position of the crimper tool 221 and the pin-insertion/torque tool on the strong-back (see Calfo FIG. 9B) is such that when the angle support 937 of the crimper tool 221 is moved to the operating setting (full lines FIG. 4) the coaction of the pin 965 and cam surface 963 (FIG. 10) advances (pivots about the axes of bushings 933) the base plate 1011 and the parts mounted on it inwardly with reference to support 915 (into the plane of the drawing as seen in FIG. 4) (to the right as seen in FIG. 3). The shoulder 1039 seats on the top of the flange 104 (FIG. 5) of the LGT 113, whose old split-pin assembly is replaced by new assemblies 100 (FIGS. 1, 2), and the cylindrical surface 1041 seats precisely against the new nut 135 (FIGS. 5, 7). The springs 1035 hold the surface 1041 in resilient engagement with the nut 135. The pin-insertion/torque tool is, during this operation, in the retracted position (761, FIG. 61 of Calfo) with the pin 127b on its blade (815, FIG. 64 of Calfo).

Near the outer end the pillow blocks 1007 engage a plate 1043 (FIG. 6) which is slideable on the rails 1003. This plate is connected to the carriage 1009. The position of the plate 1043, longitudinally of the rails 1003, is adjustable by bolts 1045 each of which is threaded into a boss 1047 on each angle 939 (FIG. 6). Each bolt carries a block 1049 at its inner end may be locked in any position by a nut 1051. The position of the carriage 1009 and the parts connected to it including base plate 1011, longitudinal of the rails 1003, is thus adjustable.

Figure 14:
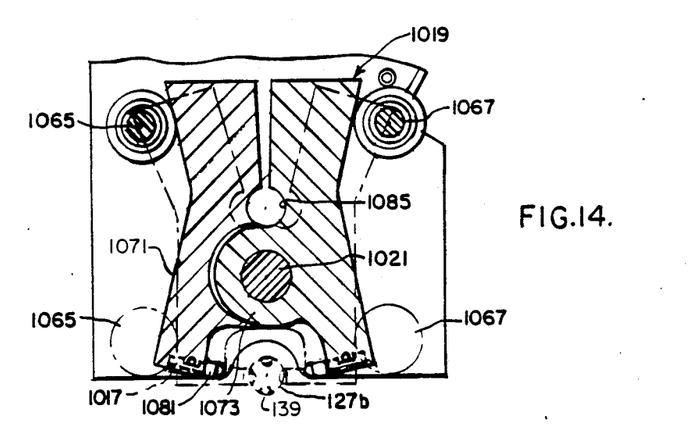
FIG. 14 is a fragmental view in transverse section taken along line XIV—XIV of FIG. 13.
Figure 15:
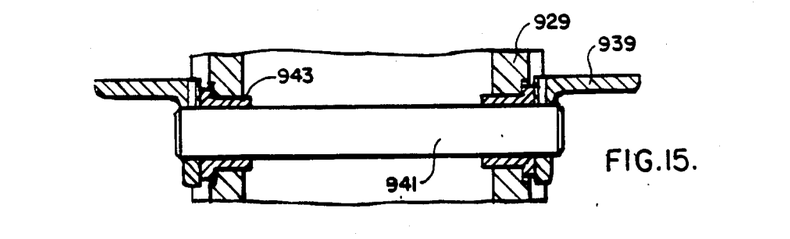
FIG. 15 is a fragmental view in section taken along line XV—XV of FIG. 4.

A cylinder 1053 (FIGS. 4, 13) is supported horizontally in carriage 1009 on an angle bracket 1055. This angle bracket is bolted to spacer blocks 1057 supported on base plate 1011. A bearing yoke or "C"-frame 1059 is mounted on an extension 1061 of the piston rod 1063 of the cylinder 1053 (FIGS. 5, 7, 13, 14). The bearing yoke 1059 supports rollers 1065 and 1067 on bearing screws 1069. These rollers engage cam surfaces 1071 of the jaws 1017 and 1019. In FIG. 14, the rollers 1065 and 1067 are shown in full lines with the jaws in the retracted position and in broken lines with the jaws in the crimping position.

The blank for jaw 1017 is shown in FIGS. 16 and 17. This jaw includes a circular hub 1073 from which arms extend. The opening in the hub is constricted at one end providing a shoulder 1075 (FIG. 17). Jaw 1019 is interlocked with jaw 1017, the constricted portion of its hub seated in the expanded portion of the hub of jaw 1017 and its lateral surface engaging shoulder 1075. The openings 1077 in the jaws are coaxial and are engaged by pin 1021 (FIGS. 5, 7). The arms of the jaws extending on each side of the hub have the cam surface 1071 on one side. Near one end each of the jaws 1017 and 1019 has an opening 1079 for a crimping pin 1081 (FIG. 14). At the same end there is an opening 1083 perpendicular to opening 1079 for a locking pin (not shown) for the crimping pin 1081. The cam surfaces 1071 have a contour such that the crimping jaws are open with the rollers 1065 and 1067 retracted (full lines FIG. 14) and closed with the rollers advanced (broken lines FIG. 14). The semi-circular extension 1085 of each hub 1073 affords clearance for the closing of the jaws.

During standby the angle support 937 is latched in the retracted position shown in broken lines in FIG. 4. When a crimping operation is to take place, the LGT is positioned with one of its new split-pin assemblies oriented for crimping and the support 937 is unlatched by remote actuation of cylinder 979 (FIGS. 4, 5). Cylinder 951 (FIG. 5) is then actuated remotely, first, to lower the support 937 vertically, then, to swing the support horizontally (to the right as seen in FIG. 3 and into the plane of the drawing as seen in FIG. 4). The base plate 1011 is positioned with its shoulder 1039 seated on the top surface of the flange 104 of the LGT which is to be processed and its cylindrical surface 1041 is seated against the surface of the new nut 135. The crimping pins are in position to crimp the cylindrical portion 160 of the locking cap 171 into opposite flutes 139 of the new split pin 127b. The LGT 113 is so positioned that a pair of opposite flutes 139 of one of its new split-pin assemblies 100 is oriented to receive the crimped projections of the cylindrical portion 160 of the locking cap 157. Cylinder 1053 is now actuated to cause the crimping pins 1081 to engage the portion 160 and crimp it onto the opposite flutes. The flutes preclude the necessity, which would be involved in the use of indentations instead of flutes, of precisely positioning the jaws 1017 and 1019 vertically to effectuate the crimping operation.

While preferred practice of this invention is disclosed herein, many modifications thereof are feasible. This invention is not to be restricted except insofar as is necessitated by the spirit of the prior art.

What I claim is:

1. In the replacement of an old split-pin assembly of the guide tube of a nuclear reactor by a new split-pin assembly, said new split-pin assembly including a new split pin and a new nut securing the new split pin to the guide tube, said new nut having a locking cap to be crimped to said new split pin, said new split-pin assembly being positioned to be processed, a method of crimping said locking cap to said new split pin, the said method being practiced with a crimping mechanism and a support for supporting said crimping mechanism, said support being in retracted position in its standby state, the said method including, advancing said support from said retracted position to an intermediate position, said support being so advanced in a first general direction, generally defined by a first plane, thereafter advancing said support in a second general direction, defined by a second plane generally transverse to said first plane, to set said crimping mechanism, relative to said positioned split-pin assembly, in position to crimp said locking cap to said new split pin, and thereafter actuating said crimping mechanism to crimp said locking cap to said new split pin.

2. The method of claim 1 practiced with a cylinder having a piston connected to the support and moveable by the cylinder, the said method including the step of moving the piston linearly continuously from a first position to a second position to advance the support both in the first general direction and in the second general direction.

3. The method of claim 1 practiced with a crimping mechanism having crimping jaws normally set in non-crimping setting, wherein the support in being advanced in the second general direction sets the crimping mechanism with crimping jaws in the non-crimping setting in a position in which the crimping jaws encompass the locking cap.

4. The method of claim 3 practiced with a crimping mechanism wherein the crimping jaws have cam surfaces and cam-follower rollers moveable cooperatively along said surfaces to set said crimping jaws selectively in non-crimping or crimping setting, said method including the step, to be carried out while the jaws encompass the locking cap in non-crimping setting, of moving said cam-follower rollers to set said crimping jaws in crimping setting.

5. The method of claim 1 practiced with the support in retracted vertical position in the standby state, wherein the first plane is generally vertical and the second plane is generally horizontal.

6. The method of claim 1 practiced with the support locked in retracted position by a latch, the said method including the step of unlocking said latch preparatory to advancing said support from said retracted position to the intermediate position.

7. The method of claim 1 practiced with a crimping mechanism having a surface which matches the external surface of the nut of the new split-pin assembly, wherein when the crimping mechanism is set in position to crimp the locking cap by advancing the support in the second direction, said surface of said crimping mechanism is seated in engagement with said external surface of said nut.

* * * * *